United States Patent [19]
Rey

[11] 3,823,358
[45] July 9, 1974

[54] BATTERY PEAKING UNIT FOR FUEL CELL POWER PLANTS
[75] Inventor: Paul R. Rey, Vernon, Conn.
[73] Assignee: United Aircraft Corporation, East Hartford, Conn.
[22] Filed: June 18, 1973
[21] Appl. No.: 371,196

[52] U.S. Cl............. 320/3, 307/66, 320/15, 320/61
[51] Int. Cl............. H02j 7/00, H02j 7/34
[58] Field of Search............. 320/2–6, 39, 320/40, 15, 21, 16–18, 61; 307/66

[56] References Cited
UNITED STATES PATENTS
3,423,599  1/1969  Hovious............. 320/15 X
3,443,115  5/1969  Timmerman, Jr............. 320/3 X Primary Examiner—J. D. Miller
Assistant Examiner—Robert J. Hickey
Attorney, Agent, or Firm—Donald F. Bradley

[57] ABSTRACT

An auxiliary storage battery or other DC rechargeable power source is connected in parallel with a fuel cell to supply additional current to a load when an overload such as the starting of a motor causes the fuel cell voltage to drop. The fuel cell voltage is sensed and when it reduces below a preselected value the auxiliary battery supplies current to the load for a preselected time interval. The storage battery is recharged by power supplied by the fuel cell only during periods when the battery is not supplying current to the load. Excessive battery drain is prevented by shutting down the peaking unit whenever fluctuations in the fuel cell voltage cause multiple peaking cycles.

5 Claims, 1 Drawing Figure

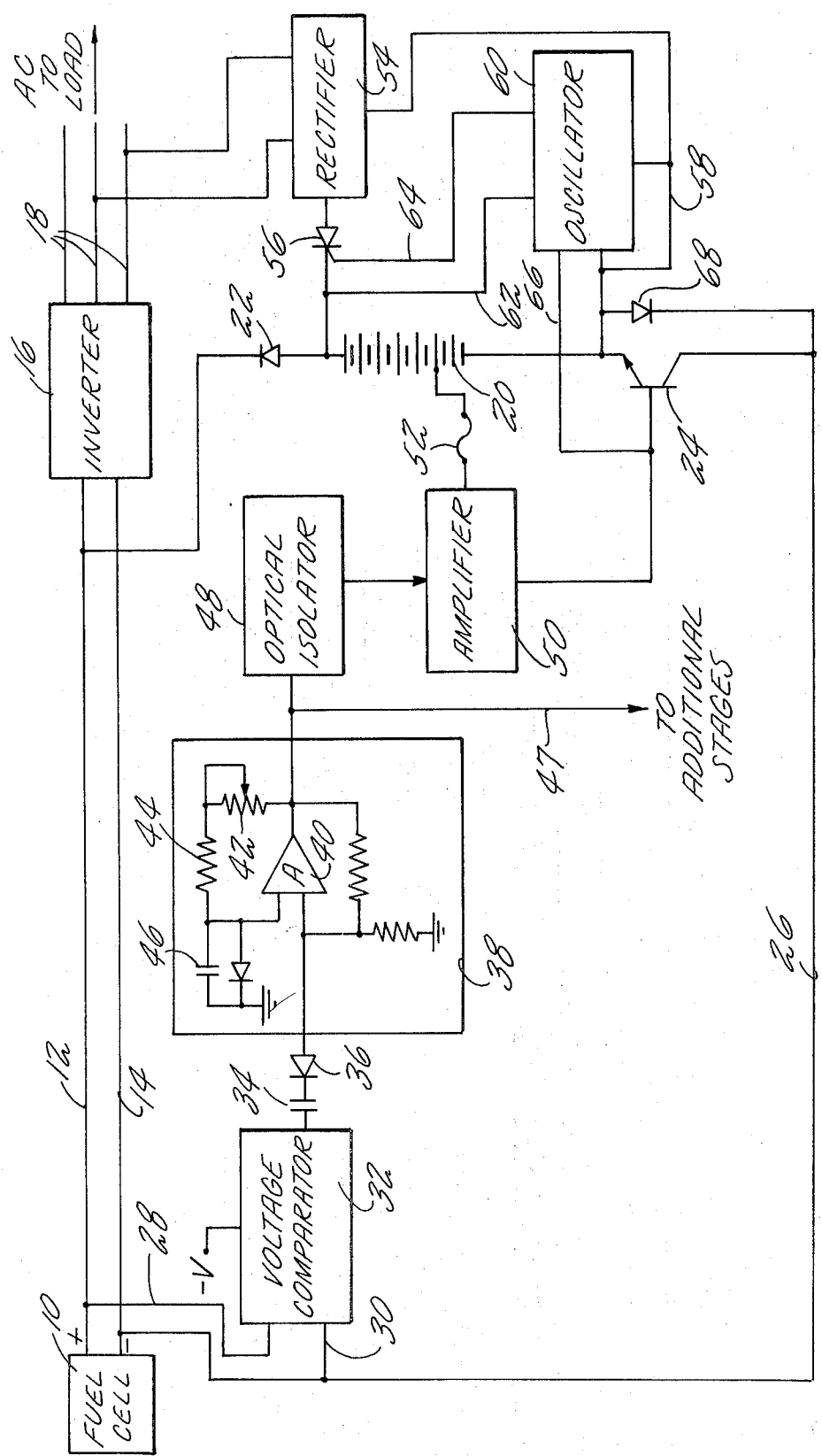

BATTERY PEAKING UNIT FOR FUEL CELL POWER PLANTS

CROSS-REFERENCE TO RELATED APPLICATIONS

This application describes and claims subject matter which is related to that disclosed in copending application Ser. No. 371,200, filed June 18, 1973, and assigned to the same assignee as the present application.

BACKGROUND OF THE INVENTION

1. Field of the Invention

This invention relates to the use of low cost batteries to provide a large short time increase in the power capability of fuel cell power plants. More specifically, one or more storage or other rechargeable batteries are connected in parallel with a fuel cell and provide additional current to a load when the current demand by the load causes the fuel cell voltage to drop below a predetermined value. The storage batteries are recharged by the output from the fuel cell when the batteries are not providing current to the load.

2. Description of the Prior Art

A fuel cell is a primary electric cell or battery in which the chemicals which react do not remain in the cell, either as electrodes or solutions, but rather are caused to flow through the cell. Gaseous hydrogen and oxygen are combined in the fuel cell to produce electric current which may be used to power a load. The construction and operation of the fuel cells is well known and will not be described in detail.

In conventional installations, the DC voltage and current supplied by the fuel cell is converted to AC power by means of an inverter, and the AC current is used to drive a load. The load may often include a motor or other high current device which may require five to six times the motor running current for a very short period. To provide the additional current, the inverter which supplies the AC power to the load can easily be oversized sufficiently to supply the overloads, but it would be much more costly to increase the size and power capabilities of the fuel cell stack to provide the additional power. Connecting storage batteries in parallel with the fuel cell DC output will supply the required additional energy at a small fraction of the fuel cell cost.

Batteries have been utilized in the prior art to minimize variations in fuel cell power supply output, but when large amounts of energy are handled, the batteries become costly and the charge/discharge efficiency is low. Furthermore, in prior art systems the battery charger and its control are large and complex.

Prior art battery peaking systems also suffer from the defect that the peaking batteries are constantly on line when an overload occurs. If the overload persists, the batteries are completely discharged and are unable to provide peaking current until they are completely recharged. System damage may also occur if the peaking battery is allowed to become completely discharged.

SUMMARY OF THE INVENTION

The present invention overcomes the deficiencies in the prior art and provides a battery peaking unit connected in parallel with a fuel cell to supply current to a load for a fixed timed interval only when the fuel cell voltage drops below a predetermined value. The electrical connection is provided by a transistor switch connected in series with the peaking battery, and further includes a diode for isolating the peaking battery from the fuel cell when fuel cell voltage exceeds the battery open circuit voltage. The output voltage from the fuel cell must rise above and then again drop below the preselected value before the peaking battery can again supply additional current to the load. If a malfunction causes oscillation of the peaking current, the unit is shut down to prevent discharge of the battery and damage to the system. The peaking battery is taper charged by power supplied from the fuel cell through an inverter by means of a silicon controlled rectifier which is controlled by an oscillator designed to free run when the battery voltage is low, and which is inhibited when the battery voltage reaches a specified set point. Charging is inhibited when the battery is providing a current to the load.

BRIEF DESCRIPTION OF THE DRAWING

The drawing shows schematically in partial block diagram form the preferred embodiment of the battery peaking system of the present invention.

DESCRIPTION OF THE PREFERRED EMBODIMENT

It is known in the prior art that a battery or a series of batteries may be connected in parallel with a fuel cell stack to provide additional current to a load during transient conditions such as the starting of a motor when additional current is required. During normal operation the fuel cell voltage is higher than the voltage of the battery, and no current is supplied by the battery. When the current required by the load increases such as upon the starting of a motor, the DC current supplied by the fuel cell increases and the fuel cell voltage is reduced below that of the battery. The battery then supplies the additional motor starting current in order to maintain sufficient voltage for operation of the motor. When the motor start is complete, the DC voltage supplied by the fuel cell again rises and the battery is disconnected from the load.

The above described operation requires a battery with very low internal impedance so that its open circuit voltage will remain below the normal operating fuel cell voltage. If this is not the case, then the battery would try to supply part of the normal load and would rapidly become discharged. Most low cost batteries for this small energy requirement have too high an open circuit voltage. To provide for this deficiency, a solid state switch such as a transistor is connected in series with the battery which permits the battery to be rapidly switched in to provide additional current when required, but which during normal operation disconnects the battery from the circuit. Control logic is used to provide the necessary intelligence for opening and closing the transistor switch at the proper time.

Referring to FIG. 1, there is shown a typical fuel cell 10 which produces a DC voltage and supplies current to an inverter 16 through bus lines 12 and 14 having polarities as shown. The inverter 16 changes the DC to AC, typically single phase three wire AC as shown by the three wires 18 emanating from the inverter. The AC power is then supplied to a load which for purposes of the present description is considered to be a motor, but which may be any other known type of load.

Connected in parallel with the fuel cell 10 is a battery 20 which may consist of one or a plurality of storage batteries connected in series. The battery 20 is connected to the DC bus line 12 through a diode 22, and the negative terminal of the battery 20 is connected to the negative line 14 of the DC bus through a transistor switch 24 and line 26. A single transistor or a bank of parallel transistors may be used. During normal operation, the voltage produced by the fuel cell 10 on line 12 is higher than the battery voltage 20, and consequently the diode 22 is reverse biased. Transistor switch 24 is normally opened, i.e., the transistor 24 is nonconducting. No current will be provided at this time from battery 20.

If the load requires additional current in excess of the capacity of the fuel cell 10, the voltage on lines 12 and 14 will drop and switch 24 will be closed, thereby permitting batteries 20 to supply current through diode 22 and the inverter 16.

A voltage comparator 32 is connected to sense the fuel cell output voltage via lines 28 and 30. The fuel cell voltage is compared with a reference voltage shown as -V. The voltage comparator 32 may consist of an operational amplifier used as a differential amplifier to isolate the voltage on lines 12 and 14 from ground and produce a voltage proportional to the DC bus voltage. This output voltage is compared with the reference -V, and when the voltage across the DC bus, lines 12 and 14, falls below the reference voltage, the voltage comparator 32 produces a step voltage output which is fed through a capacitor 34 to produce a voltage spike which in turn passes through diode 36 into a monostable multivibrator shown generally at 38.

An embodiment of a specific multivibrator is shown in the figure, but it will be apparent that other types of multivibrators or pulsing circuits may be used. As shown in the figure, the voltage spike is fed to the input of amplifier 40 whose output becomes saturated by virtue of positive feedback around amplifier 40. The output from amplifier 40 is compared at its input with the voltage across capacitor 46 which charges at a rate determined by the series resistance of resistors 42 and 44. When the voltage across capacitor 46 becomes sufficiently large, the output from the amplifier 40 will saturate in the opposite polarity. Once the amplifier 40 has saturated, the input voltage spike will have dissipated. Capacitor 46 will then discharge to ground thereby resetting the multivibrator to a condition where it will respond to a subsequent voltage spike from voltage comparator 32. If a subsequent voltage spike is received before the multivibrator has reset, the multivibrator will not respond for another timing cycle.

The output from the multivibrator 38 is a pulse which has an on time $\Delta t$ which may be adjusted between approximately ½ to 5 seconds by varying the resistance of potentiometer 42. The reset time of the multivibrator is approximately equivalent to $\Delta t$.

The output of the multivibrator 38 is the logic control signal which ultimately causes activation of transistor switch 24. The multivibrator output may also be fed to slave battery peaking units via line 47 to allow control of multiple peaking units in parallel by one logic control signal. The output from the multivibrator is fed into an optical isolator stage 48 which may consist of an optically coupled transistor. Isolation is desirable since the ground of the electronics drive stage may be at a different potential from the common terminal of the fuel cell.

The output from the optically coupled transistor isolator 48 is fed through amplifier 50 to cause transistor 24 to turn on. When transistor 24 conducts, the impedance of the transistor 24 becomes essentially zero and a closed path is provided for current from batteries 20. Current is therefore provided to the inverter from the batteries 20 through diode 22 when transistor 24 is turned on. Since the transistor 24 will be turned on only upon the occurrence of an output pulse from a multivibrator 38, and for a time between ½ to 5 seconds, current will flow from batteries 20 to the load only for the time determined by the output from the multivibrator 38. If the output voltage from the fuel cell 10 rises to a sufficient level during this time period, no additional current will be required from the batteries 20. If, at a later time, the output voltage from fuel cell 10 decreases below the value determined by the reference voltage -V, an additional signal will be produced by voltage comparator 32 and multivibrator 38 which will turn on transistor 24 and cause current again to be supplied by the batteries 20. If the output voltage from the fuel cell 10 remains below the reference voltage, or rises above the reference voltage and then drops below the reference voltage prior to the time that the multivibrator 38 is reset, no additional output will be produced by the multivibrator 38 and transistor 24 will remain nonconducting thereby maintaining an open circuit for the batteries 20. Consequently, the batteries 20 will provide current through the inverter 16 to the load only when the output voltage from the fuel cell drops below a value determined by the reference voltage -V and current will be provided only for a time determined by the timing pulse produced from multivibrator 38. The multivibrator 38 must reset and the output from the fuel cell 10 must rise above the reference value before another pulse of current can be provided to the system from the batteries 20.

The reset time provided by the multivibrator 38 is necessary because the output voltage from the fuel cell will rise as transistor switch 24 connects the batteries 20 in parallel with the fuel cell, and the voltage comparator 32 would cause the transistor switch 24 to switch at high frequency as the fuel cell output voltage would swing alternately above and below the reference voltage level -V.

A fuse 52 which is connected between an intermediate tap of the batteries 20 and the amplifier 50 through which power is supplied to the amplifier 50 will blow and terminate the entire peaking cycle if the entire system oscillates, that is, if the fuel cell output voltage rises above and then drops below the reference value a number of cycles during a short time period. The fuse 52 can be sized depending upon the particular system operation to permit the fuse to blow and thereby prevent battery drain when it is apparent because of the cycling that a malfunction has occurred in the system.

The battery 20 may be recharged from the output of the inverter. A rectifier 54 is connected to the output 18 of inverter 16 and converts the single phase AC to DC. Current is supplied from the rectifier 54 through a silicon controlled rectifier 56 and through the batteries 20, with a return to the rectifier through line 58 from the negative side of the batteries 20. A voltage controlled oscillator 60 is connected to sense the potential across the battery 20 via lines 62 and 58. When the battery voltage is low, oscillator 60 produces a series of pulses which turn on silicon controlled rectifier 56 so that pulses of charging current are fed from rectifier 54 to charge the batteries 20. When the voltage from the batteries 20 reaches a predetermined charge value, the oscillator 60 is turned off and no additional charging current can pass through silicon controlled rectifier 56. An additional line 66 connects the output from amplifier 50 with oscillator 60. A pulse from the output of amplifier 50 which will turn on transistor 24 is also conducted to the oscillator 60 to turn the oscillator off and prevent charging of the batteries while the batteries are providing power to the load.

The oscillator 60 is designed to free run when the battery voltage 20 is low and is inhibited when the battery voltage reaches a specified set point. One method of accomplishing this result is to use a Zener diode to limit the voltage supplied to the oscillator 60. The batteries 20 are charged at a maximum ampere rate during initial charging and then taper charged as the batteries near complete charge.

A diode 68 is preferably connected across the emitter and collector circuit of transistor 24 in order to provide reverse voltage protection.

With the use of the present fuel cell battery peaking system, two undesirable conditions are avoided, namely, a motor will not "hang up," that is, be unable to come up to speed because of insufficient AC voltage, and light flicker will be minimized as a result of low AC voltage from insufficient system capacity.

Other advantages of the present system are that the system can be designed to support longer transient overloads without oversizing the fuel cell. For example, the load may consist of a large motor, run intermittently, such as an air compressor motor. The battery peaking system could supplement the output of a fuel cell for the first few minutes of operation when its output is not up to rated value because of cold temperatures. A modified battery peaking system may also be used during power plant start up to provide DC power for power plant parasite power requirements.

Alternate arrangements of the fuel cell, battery charging means and inverter sections are also possible. For example, in a two stage inverter consisting of a regulator stage and an inverter power section, the battery may be placed in parallel with the output from the regulator stage. With this arrangement, the regulator may not be sized for peak power since the peak power from the battery is fed directly into the inverter power stage.

This arrangement not only results in a lower cost regulator stage, but also eliminates the peak power losses that would occur in the regulator, resulting in a more efficient system.

While the invention has been described in terms of its preferred embodiment, it would be apparent to those skilled in the art that modifications may be made in the construction and arrangement of parts without departing from the scope of the invention as hereinafter claimed.

I claim:

1. A battery peaking unit for a fuel cell comprising:

a fuel cell having a pair of output terminals through which current is supplied to a load,
   a battery adapted to supply additional current to said load and connected across said fuel cell output terminals,
   normally high impedance switch means connected in series with said battery,
   means connected across said fuel cell output terminals for generating an output pulse of fixed time duration when the output voltage from said fuel cell drops below a predetermined value,
   and means connecting said output pulse to said switch means to cause activation of said switch means and to permit current to flow from said battery to said load only for the duration of said output pulse.

2. A battery peaking unit as in claim 1 in which said switch means is a transistor which is normally nonconducting and which is rendered conducting by said output pulse.

3. A battery peaking unit as in claim 1 in which an inverter is connected to receive the current supplied by said fuel cell, the output current from said inverter being supplied to said load,
   and battery charging means for supplying a portion of said inverter output current to charge said battery when the voltage of said battery drops below a preselected value.

4. A battery peaking unit as in claim 1 and including a diode connected in series with said battery for preventing current flow from said fuel cell to said battery.

5. A battery peaking unit as in claim 1 and including means for disabling said battery peaking unit upon the occurrence of an oscillating condition thereof.

* * * * *